(12) United States Patent  (10) Patent No.: US 8,152,215 B1
Tsumiyama et al.  (45) Date of Patent: Apr. 10, 2012

(54) UTILITY VEHICLE

(75) Inventors: Yoshinori Tsumiyama, Lincoln, NE (US); Hidetoshi Kaku, Lincoln, NE (US); Tyler Furman, Raymond, NE (US); Kazuhiro Maeda, Akashi (JP)

(73) Assignee: Kawasaki Jukogyo Kabushiki Kaisha, Kobe-shi (JP)

( * ) Notice: Subject to any disclaimer, the term of this patent is extended or adjusted under 35 U.S.C. 154(b) by 0 days.

(21) Appl. No.: 12/979,234

(22) Filed: Dec. 27, 2010

(51) Int. Cl.
*B60N 2/00* (2006.01)

(52) U.S. Cl. .................. 296/63; 297/354.1; 297/452.18; 297/452.2

(58) Field of Classification Search ............. 297/362.12, 297/354.1, 362.13, 452.18, 452.2, 463.1; 296/63
See application file for complete search history.

(56) References Cited

U.S. PATENT DOCUMENTS

| 4,632,452 A * | 12/1986 | Vogel ............................ 297/232 |
| 5,568,961 A * | 10/1996 | Colasanti ................. 297/362.12 |
| 6,767,055 B1 * | 7/2004 | Sparks ..................... 297/216.14 |
| 2001/0010431 A1 * | 8/2001 | Sasaki et al. ............... 297/250.1 |

FOREIGN PATENT DOCUMENTS

| JP | 07-061265 | 3/1995 |
| JP | 2007-276703 A | 10/2007 |

* cited by examiner

*Primary Examiner* — Lori Lyjak

(74) *Attorney, Agent, or Firm* — Alleman Hall McCoy Russell & Tuttle LLP

(57) ABSTRACT

A utility vehicle comprises a vehicle body frame; a seat frame including a seat bottom support member and a seat backrest support member, at least the seat bottom support member and the seat backrest support member being formed by square pipes with rectangular cross-sections; a seat bottom fastened to the seat bottom support member; and a seat backrest fastened to the seat backrest support member; wherein the seat bottom support member and the seat backrest support member of the seat frame are integral with each other to have a bent portion; and the seat bottom support member of the seat frame is fastened to the vehicle body frame.

9 Claims, 12 Drawing Sheets

UTILITY VEHICLE

BACKGROUND OF THE INVENTION

1. Field of the Invention

The present invention relates to a utility vehicle including a vehicle body frame, a seat frame fastened to the vehicle body frame, a seat bottom fastened to the seat frame and a seat backrest fastened to the seat frame.

2. Description of the Related Art

Japanese Laid-Open Patent Application Publication No. 2007-276703 discloses an example of a conventional utility vehicle. In the utility vehicle, an engine is mounted to a vehicle body frame and a plurality of pipe members are arranged to cover the engine. A seat on which a passenger is seated is fastened to a part of the pipe members. In this utility vehicle, the seat includes a seat frame, a seat bottom and a seat backrest which are unitarily coupled to each other. Therefore, the entire seat is required to be changed even when only a specification of the seat frame is changed depending on a location of the seat, etc. This increases the kinds of the seats and inventory management of the seat is burdensome. When the seat is assembled, it is necessary to incorporate the seat frame into an interior of the seat bottom and the seat backrest, which makes it difficult to assemble the seat.

Japanese Patent Publication No. 3340205 (FIGS. 5 and 6) discloses a seat including a seat frame constituted by round pipes having circular cross-sections, a seat bottom, and a seat backrest. Since it is difficult to fabricate the round pipes constituting the seat frame, a yield of the seat is not improved, and a manufacturing cost increases. In addition, an outer surface of the seat frame constituted by the round pipes cannot be made in surface contact with an outer surface of a vehicle body frame at a joint portion at which the seat frame is joined to the vehicle body frame. For this reason, it is difficult to enhance a joint stiffness and a vibration resistance at the joint portion, which is not suitable in the utility vehicle which tends to vibrate significantly. Under the circumstances, there has been a need for a utility vehicle which can achieve an easier assembling process, reduction of a manufacturing cost, and a higher vibration resistance.

SUMMARY OF THE INVENTION

A utility vehicle of the present invention comprises a vehicle body frame; a seat frame including a seat bottom support member and a seat backrest support member, at least the seat bottom support member and the seat backrest support member being formed by square pipes; a seat bottom fastened to the seat bottom support member; and a seat backrest fastened to the seat backrest support member; wherein the seat bottom support member and the seat backrest support member of the seat frame are integral with each other to have a bent portion; and the seat bottom support member of the seat frame is fastened to the vehicle body frame.

In accordance with this configuration, since the seat bottom support member and the seat backrest support member of the seat frame are formed by the square pipes with rectangular cross-sections, the seat frame can be manufactured by bending and welding the square pipes. The seat can be assembled easily in such a manner that the seat bottom and the seat backrest are fastened to the seat frame. Since the seat bottom support member constituted by the square pipes can be fastened to the vehicle body frame in surface contact with the vehicle body frame, a vibration resistance of the utility vehicle, which tends to vibrate significantly, can be improved. Furthermore, since the seat frame, the seat bottom and the seat backrest are manufactured as separate components, only the seat frame can be changed in a case where only a specification of the seat frame is changed, depending on, for example, a location of the seat.

The above and further objects and features of the invention will more fully be apparent from the following detailed description with accompanying drawings.

DETAILED DESCRIPTION OF THE PREFERRED EMBODIMENTS

Hereinafter, embodiments of the present invention will be described with reference to the drawings. The stated directions are referenced from the perspective of a driver riding in a utility vehicle, unless otherwise explicitly noted.

Embodiment 1

Figure 1:
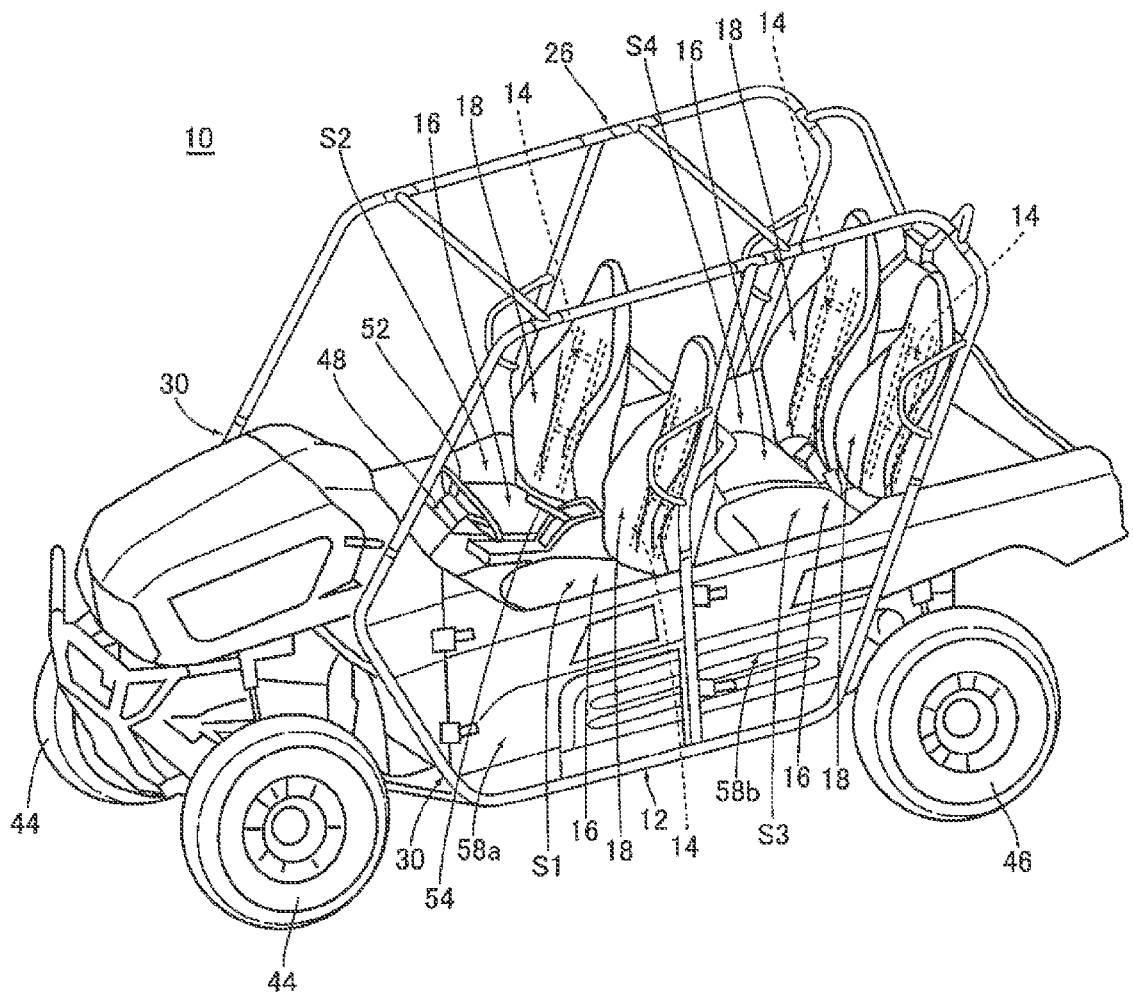
FIG. 1 is a perspective view showing an external appearance of a utility vehicle according to Embodiment 1.
Figure 2:
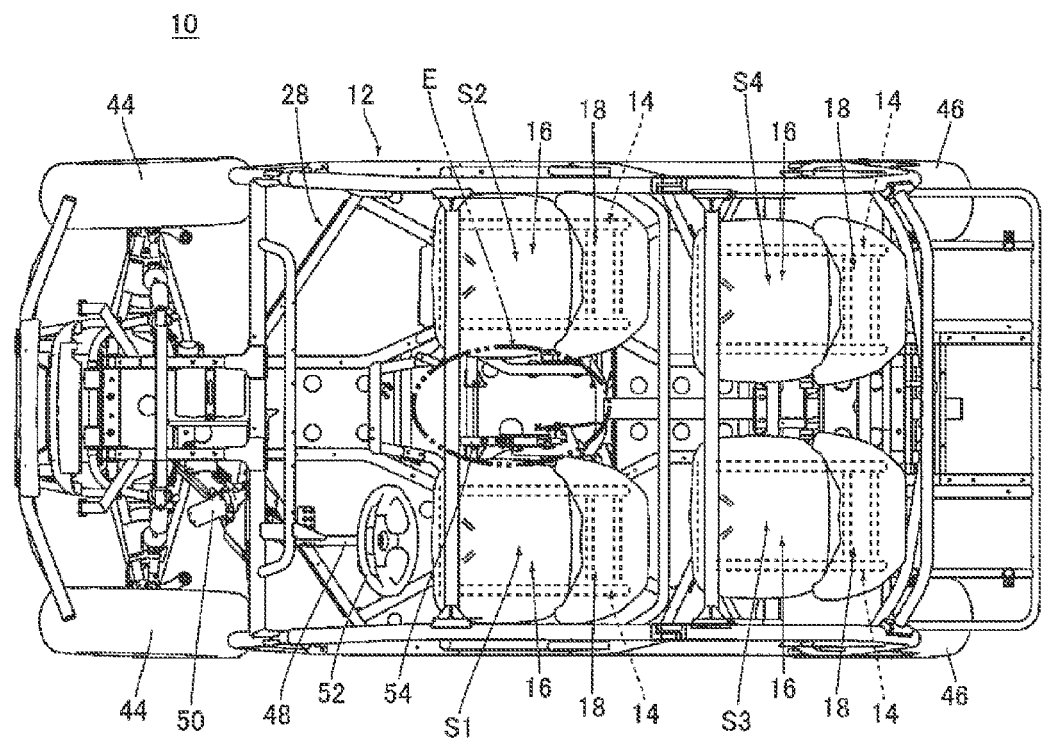
FIG. 2 is a plan view showing a configuration of the utility vehicle according to Embodiment 1.
Figure 3:
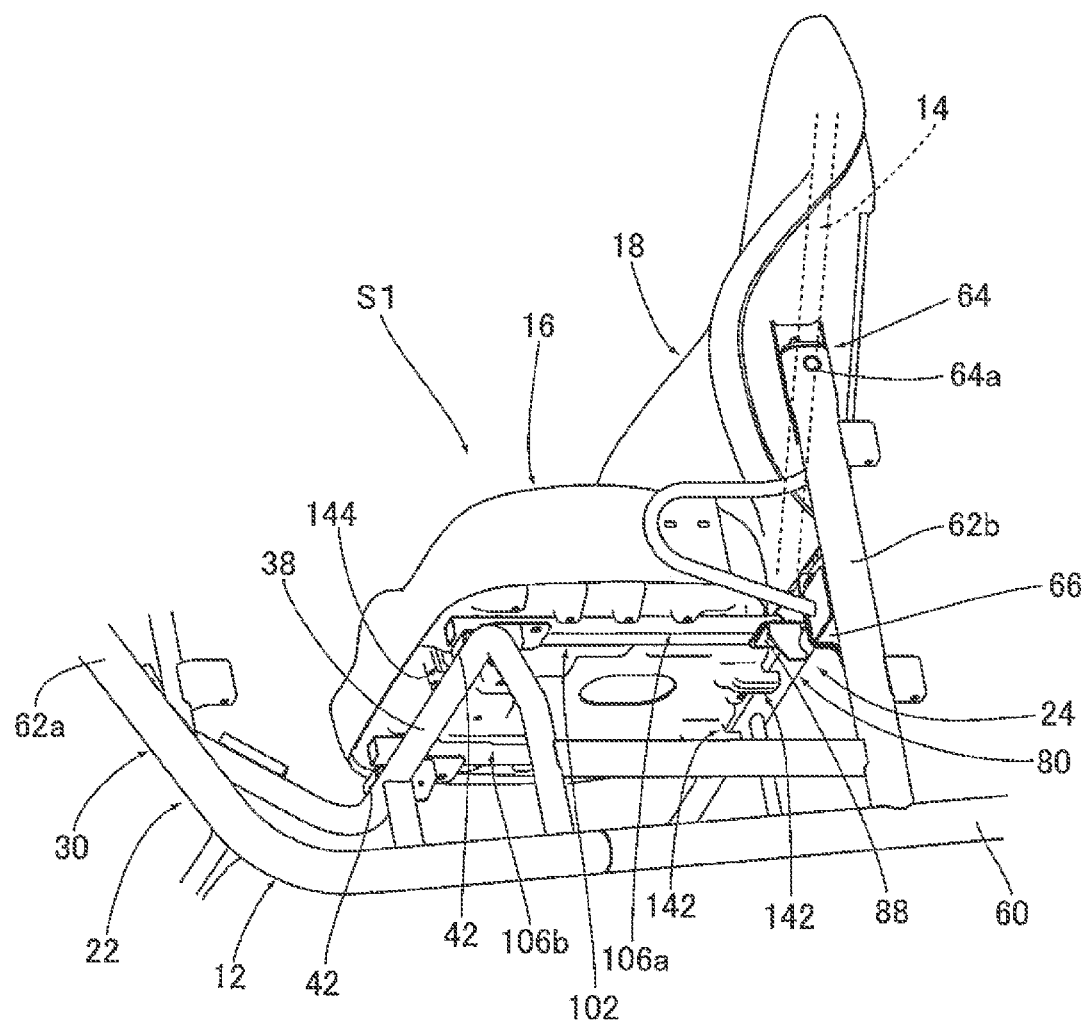
FIG. 3 is a perspective view showing a state where a seat is mounted to a vehicle body frame as viewed from obliquely downward.

FIG. 1 is a perspective view showing an external appearance of a utility vehicle 10 (recreation utility vehicle) according to Embodiment 1. FIG. 2 is a plan view showing a configuration of the utility vehicle 10 according to Embodiment 1. FIG. 3 is a plan view showing a state where a seat S1 is mounted to a vehicle body frame 12 as viewed from obliquely downward.

Referring to FIGS. 1 to 3, the utility vehicle 10 includes the vehicle body frame 12, four seat frames 14 mounted to the vehicle body frame 12, seat bottoms 16 mounted to the four seat frames 14, respectively, and seat backrests 18 mounted to the four seat frames 14, respectively. Each of the four independent seats S1-S4 includes the seat frame 14, the seat bottom 16 and the seat backrest 18. In this embodiment, the seats S1 and S2 at the front side are arranged side by side in a rightward and leftward direction, and the seats S3 and S4 are arranged side by side in the rightward and leftward direction, behind the seats S1 and S2, respectively. The seat S1 located at a front side and at a left side is a driver seat.

Figure 4:
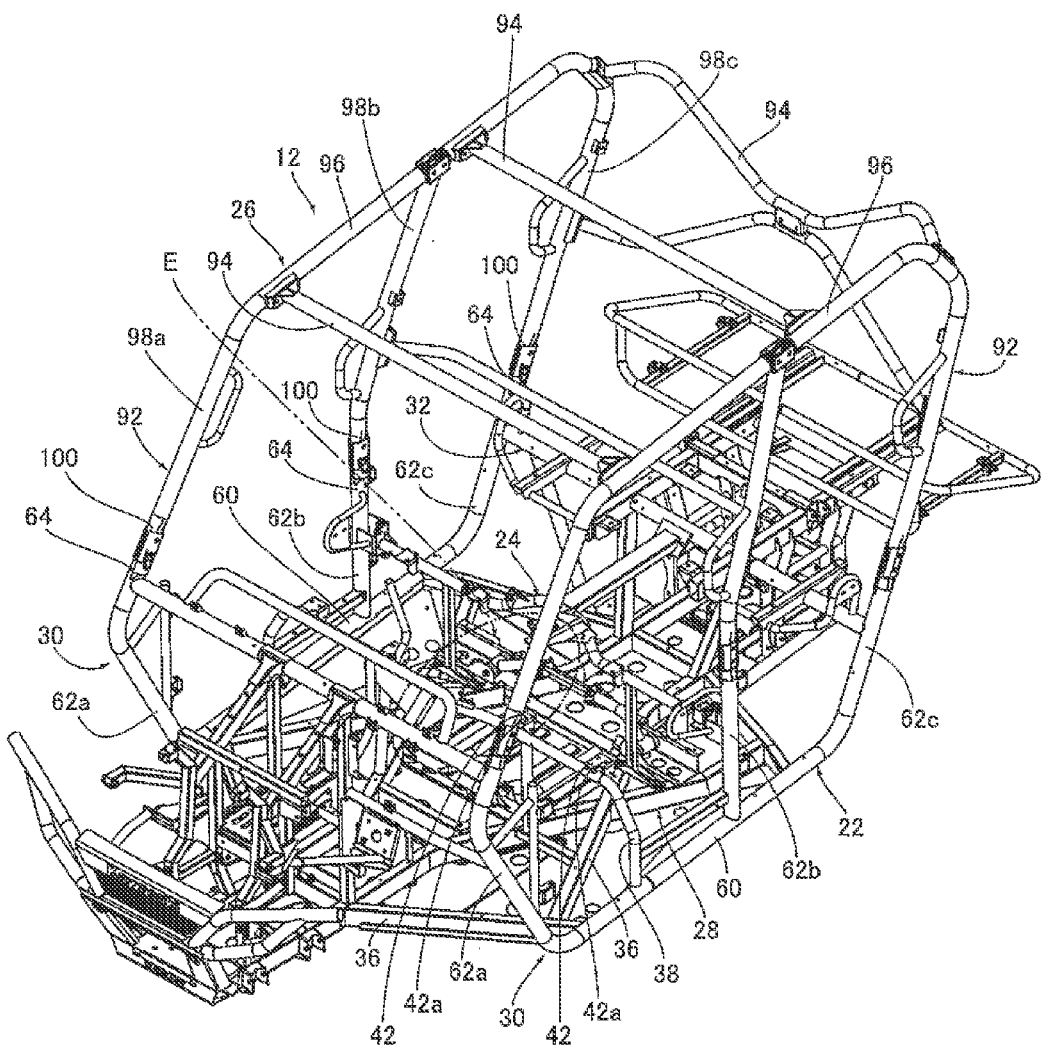
FIG. 4 is a perspective view showing a configuration of the vehicle body frame.
Figure 5:
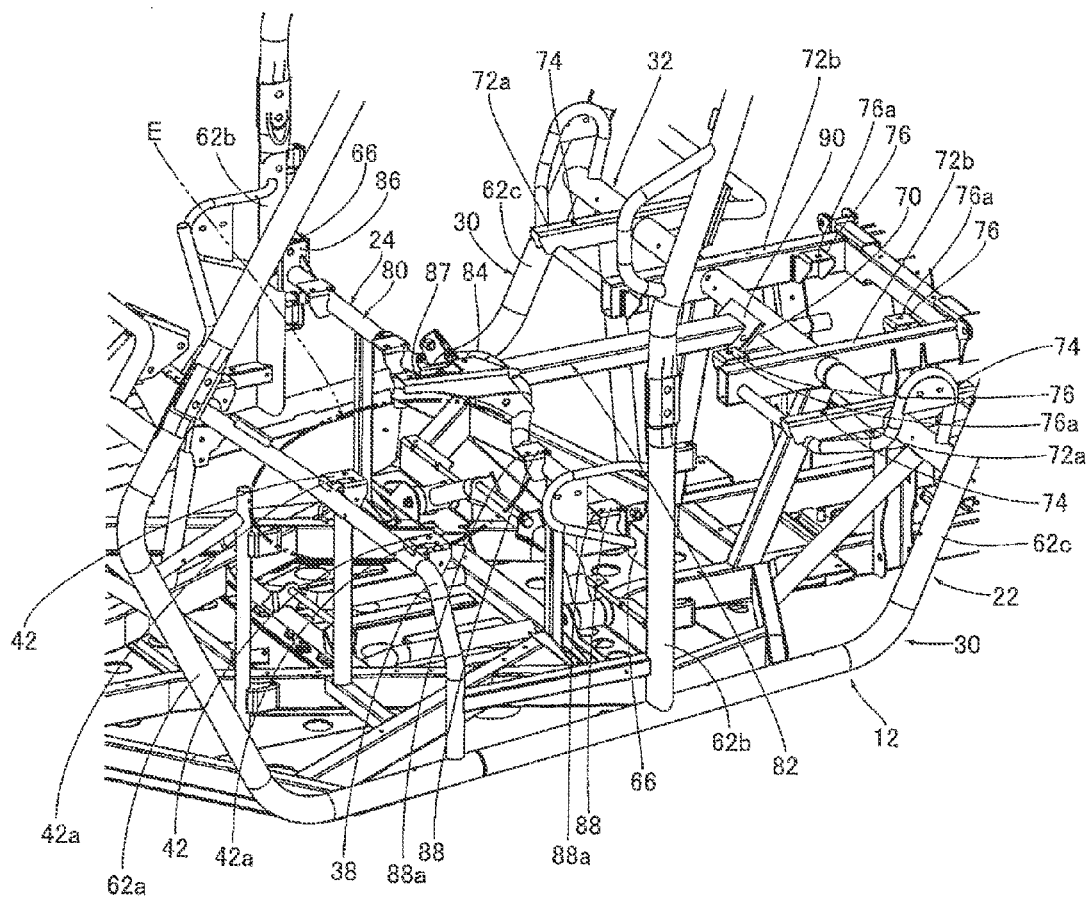
FIG. 5 is a perspective view showing a configuration of a part of the vehicle body frame.

FIG. 4 is a perspective view showing a configuration of the vehicle body frame 12. FIG. 5 is a perspective view showing a configuration of a part of the vehicle body frame 12. Referring to FIG. 4, the vehicle body frame 12 includes a main frame 22, a sub-frame 24 (FIG. 5) for reinforcing the main frame 22, and a cabin frame (e.g. a roll-over protective structure ROPS) 26.

As shown in FIG. 4, the main frame 22 includes a floor member 28 which is opposite to a road surface or a ground, a pair of right and left side members 30 which extend upward from right and left side portions of the floor member 28, and a cross member 32 coupling the side members 30 to each other.

As shown in FIG. 2, the floor member 28 is a base member configured to support the engine E and the seats S1-S4. As shown in FIG. 4, the floor member 28 includes a plurality of square pipes 36 with rectangular cross-sections, extending horizontally and being welded unitarily to each other. At a portion of an upper surface of the floor member 28, corresponding to a front end portion of each of the seats S1 and S2, an arch-shaped support pipe 38 is disposed to extend in the rightward and leftward direction and configured to support the seat frame 14. Each support pipe 38 is provided with two plates 42 arranged to be spaced apart from each other in the rightward and leftward direction. The plates 42 have holes 42a into which the bolts 40 (FIG. 6) are inserted, respectively. Each of the two plates 42 has a flat upper surface.

Referring to FIG. 2, two front wheels 44 are suspended from the front portion of the floor member 28, two rear wheels 46 are suspended from the rear portion of the floor member 28, and an engine E is mounted at the center portion of the floor member 28. The four seats S1-S4 are arranged on the upper surface of the floor member 28 at right and left sides and at the front and rear sides. A steering shaft 48 is provided forward relative to the seat S1. An electric power steering device 50 is coupled to a lower end portion of the steering shaft 48. A handle 52 steered by the driver is coupled to an upper end portion of the steering shaft 48. A lever 54 of a parking brake is provided at a right side of the seat S1.

As shown in FIG. 1, each side member 30 is configured to support the cabin frame (ROPS) 26, a front door 58a and a rear door 58b. As shown in FIG. 4, the side member 30 includes a side pipe element 60 extending in a forward and rearward direction at a side portion of the floor member 28 in the rightward and leftward direction, a first lower pillar pipe element 62a extending upward from a front end portion of the side pipe element 60, a second lower pillar pipe element 62b extending upward from a center portion of the side pipe element 60 in the forward and rearward direction, and a third lower pillar pipe element 62c extending upward from a rear end portion of the side pipe element 60. The side pipe element 60 and the lower pillar pipe elements 62a-62c are round pipes having circular cross-sections. The side pipe element 60 is welded to the square pipe 36 of the floor member 28. As shown in FIG. 3, connecting portions 64 having holes 64a into which bolts are inserted are provided at upper end portions of the lower pillar pipe elements 62a-62c, respectively. As shown in FIG. 5, a connecting portion 66 having a hole into which a bolt is inserted is provided at a vertical center portion of each of the second lower pillar pipe elements 62b.

Referring to FIG. 5, the cross member 32 is a pipe member for coupling third lower pillar pipe elements 62c of the pair of right and left side members 30. One end portion of the cross member 32 is welded to the third lower pillar pipe element 62c, while an opposite end portion thereof is coupled to the third lower pillar pipe element 62c. The cross member 32 is provided with a connecting portion 70 having a hole into which a bolt is inserted, at a center portion thereof in a longitudinal direction of the cross member 32. Two support pipes 72a and 72b extending in the forward and rearward direction are welded to portions of the cross member 32 respectively corresponding to the seats S3 and S4 (FIG. 2), to support the seat frame 14 (FIG. 2). The support pipes 72a and 72b are square pipes having rectangular cross-sections. The upper surfaces of the support pipes 72a and 72b are flat surfaces with which seat bottom support members 102 (FIG. 6) of the seat frame 14 (FIG. 2) are in surface contact. The support pipe 72a is provided with two threaded holes 74 which are arranged to be spaced apart in the forward and rearward direction and into which bolts 40 (FIG. 6) are threadingly engaged. Two plates 76 having threaded holes 76a into which bolts 40 (FIG. 6) are threadingly engaged are welded to a side surface of the support pipe 72b.

Referring to FIG. 5, the sub-frame 24 includes a cross member 80 extending in the rightward and leftward direction and a longitudinal member 82 provided behind the cross member 80 to extend in the forward and rearward direction. The cross member 80 is a pipe member for coupling second lower pillar pipe elements 62b of the right and left side members 30. The cross member 80 has a bent portion 84 at a center portion in the longitudinal direction such that the bent portion 84 is bent upward in a rearward direction to avoid interference with the engine E. Connecting portions 86 having holes into which bolts are inserted are provided at both ends of the cross member 80, respectively, in the longitudinal direction. The connecting portions 86 are coupled to the connecting portions 66 of the main frame 22, respectively, by bolts and others. A bracket 87 is welded to a longitudinal center portion of the cross member 80 to support the lever 54 (FIG. 2). Two plates 88 are welded to portions of the cross member 80 respectively corresponding to rear end portions of the seats S1 and S2, respectively such that the two plates 88 are arranged to be spaced apart from each other in the rightward and leftward direction. The plates 88 have threaded holes 88a into which bolts 40 (FIG. 6) are threadingly engaged. The upper surfaces of the two plates 88 are flat surfaces. The longitudinal member 82 is a pipe member for coupling the cross member 80 to the cross member 32 of the main frame 22. A front end portion of the longitudinal member 82 is welded to the bent portion 84, and a connecting portion 90 having a hole into which a bolt is inserted is provided at a rear end portion of the longitudinal member 82. The connecting portion 90 is connected to the connecting portion 70 of the cross member 32 by bolts and the like.

As shown in FIG. 4, the cabin frame (ROPS) 26 includes a pair of right and left side members 92 coupled to the right and left side members 30, respectively, and a plurality of cross members 94 coupling the side members 92 to each other. Each side member 92 includes a side pipe element 96 positioned opposite to the side pipe element 60 of the main frame 22, a first upper pillar pipe element 98a extending downward from a front end portion of the side pipe element 96, a second upper pillar pipe element 98b extending downward from a center portion of the side pipe element 96 in the forward and rearward direction, and a third upper pillar pipe element 98c extending downward from a rear end portion of the side pipe element 96. Connecting portions 100 having holes into which bolts are inserted are provided at lower end portions of the upper pillar pipe elements 98a-98c, respectively. The connecting portions 100 are connected to the connecting portions 64 of the side members 30, respectively, by bolts and others.

As shown in FIGS. 1 and 2, each of the seats S1-S4 includes the seat frame 14, the seat bottom 16, and the seat backrest 18. In this embodiment, the seat frames 14 of the left seats S1 and S3 have the same structure, while the seat frames 14 of the right seats S2 and S4 have the same structure. The seat frame 14 of the left seat S1 and the seat frame 14 of the right seat S2 are symmetric in the rightward and leftward direction, while the seat frame 14 of the left seat S3 and the seat frame 14 of the right seat S4 are symmetric in the rightward and leftward direction. The seat bottoms 16 of the seats S1-S4 have the same structure and the seat backrests 18 of the seats S1-S4 have the same structure. The seat frame 14, the seat bottom 16 and the seat backrest 18 of the seat S1 will be described hereinafter, by way of example. Since the left seat S3 is identical to the left seat S1 and the right seats S2 and S4 are symmetric with the seat S1 in the rightward and leftward direction, the left seat S3 and the right seats S2 and S4 will not be described specifically.

Figure 6:
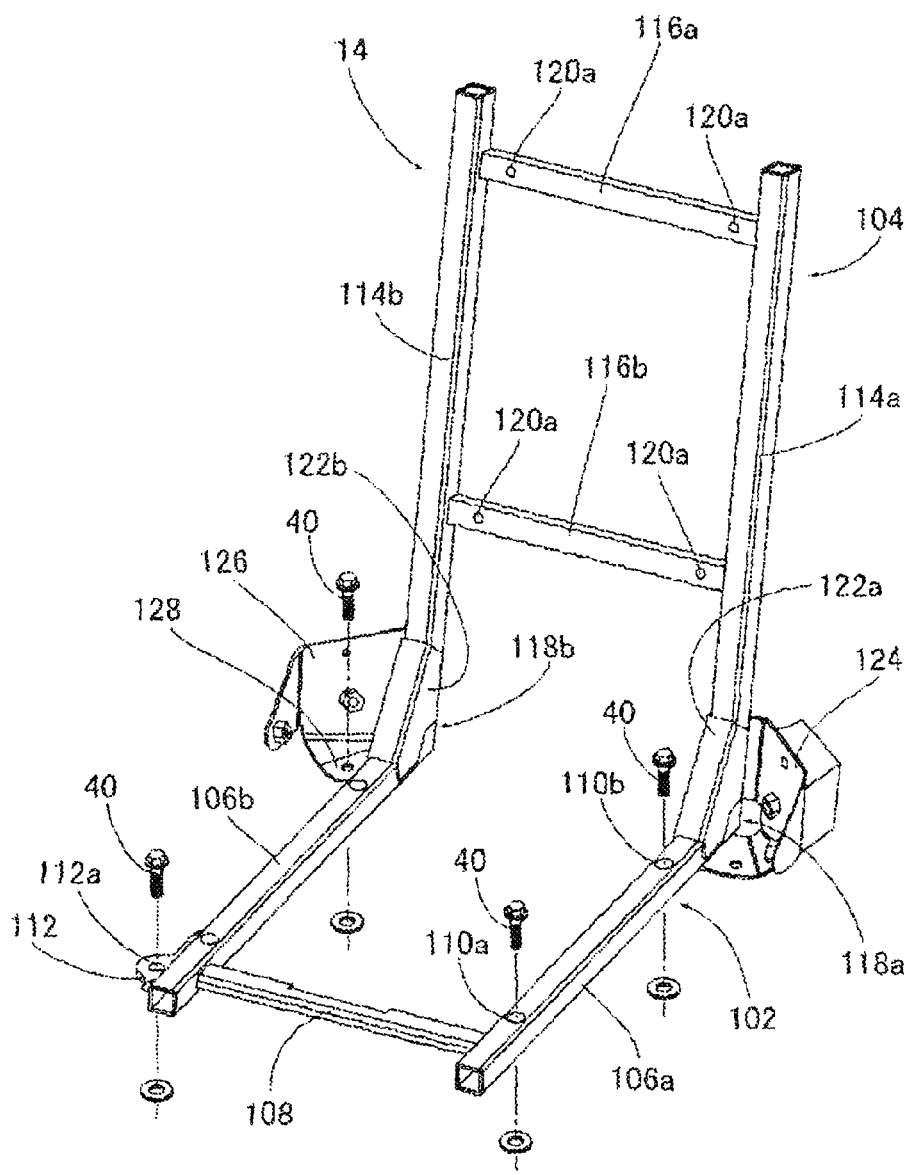
FIG. 6 is a perspective view showing a configuration of a seat frame.

FIG. 6 is a perspective view showing a configuration of the seat frame 14. Referring to FIG. 6, the seat frame 14 includes a seat bottom support member 102 for supporting the seat bottom 16 and a seat backrest support member 104 for supporting the seat backrest 18.

The seat bottom support member 102 includes two support pipes 106a and 106b arranged to extend in the forward and rearward direction in parallel with each other and a coupling pipe 108 for coupling the two support pipes 106a and 106b to each other. The support pipes 106a and 106b are square pipes having rectangular cross-sections. The support pipes 106a and 106b are designed to have a length larger than a distance between the support pipe 38 of the main frame 22 and the cross member 80 of the sub-frame 24. The support pipe 106a is provided with holes 110a and 110b which are spaced apart from each other in the forward and rearward direction. Bolts 40 (FIG. 6) are inserted into the holes 110a and 110b, respectively. A plate 112 is attached to an outer side surface of a front end portion of the support pipe 106b, and has a hole 112a into which the bolt 40 (FIG. 6) is inserted. The coupling pipe 108 is a square pipe having a rectangular cross-section. One end portion of the coupling pipe 108 is welded to a front end portion of the support pipe 106a, while an opposite end portion thereof is welded to a front end portion of the support pipe 106b.

Figure 9:
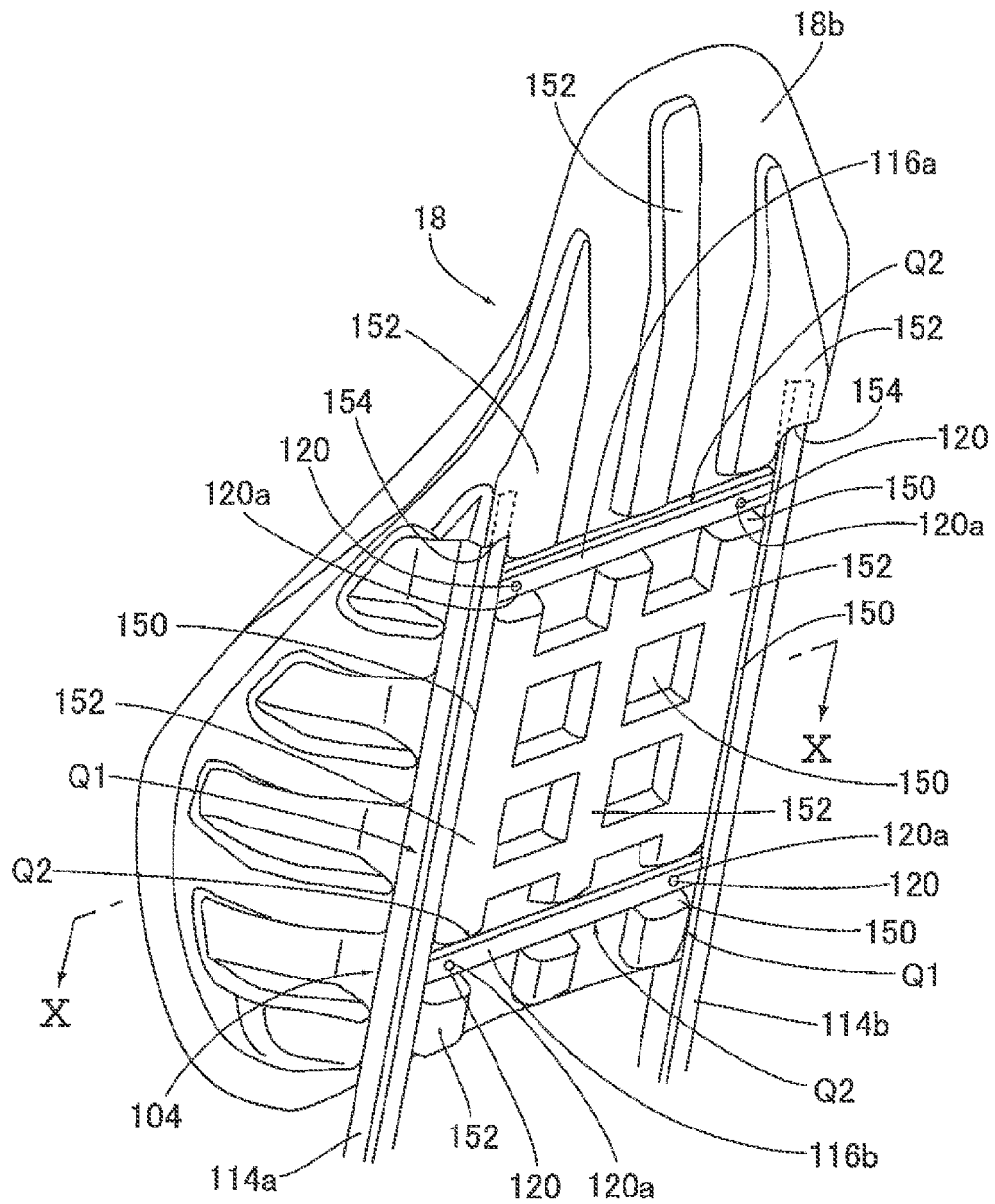
FIG. 9 is a perspective view showing a state where a seat backrest is fastened to the seat frame.

The seat backrest support member 104 includes two support pipes 114a and 114b arranged to extend vertically in parallel with each other, and two coupling pipes 116a and 116b for coupling the support pipes 114a and 114b to each other. The support pipes 114a and 114b are square pipes having rectangular cross-sections. The support pipe 114a is connected to the support pipe 106a of the seat bottom support member 102 via a bent portion 118a, while the support pipe 114b is connected to the support pipe 106b of the seat bottom support member 102 via a bent portion 118b. Each of the coupling pipes 116a and 116b is a square pipe having a rectangular cross-section. One end portion of each of the coupling pipes 116a and 116b is welded to the support pipe 114a, while an opposite end portion of each of the coupling pipes 116a and 116b is welded to the support pipe 114b. As shown in FIG. 9, the positions of the two coupling pipes 116a and 116b are designed according to a shape of the seat backrest 18. In this embodiment, the coupling pipe 116a is located slightly above a vertical center portion of the seat backrest 18, while the coupling pipe 116b is located at a lower portion of the seat backrest 18. Each of the coupling pipes 116a and 116b has holes 120a into which bolts 120 are inserted, respectively.

As shown in FIG. 6, at the bent portion 118a or in the vicinity of the bent portion 118a, a metal-made reinforcement plate 122a for reinforcing the bent portion 118a and a seat belt accommodating portion 124 for accommodating a seat belt (not shown) are fastened to the support pipe 106a of the seat bottom support member 102 and the support pipe 114a of the seat backrest support member 104. In this embodiment, the seat belt accommodating portion 124 is a retractor which winds back the seat belt. At the bent portion 118b or in the vicinity of the bent portion 118b, a metal-made reinforcement plate 122b for reinforcing the bent portion 118b and a seat belt fastening portion 126 for fastening the seat belt are fastened to the support pipe 106b of the seat bottom support member 102 and the support pipe 114b of the seat backrest support member 104. The reinforcement plate 122b has a hole 128 into which the bolt 40 (FIG. 6) is inserted.

When the seat frame 14 is manufactured, initially, the support pipe 106a of the seat bottom support member 102 and the support pipe 114a of the seat backrest support member 104 are formed unitarily to have the bent portion 118a, and the support pipe 106b of the seat bottom support member 102 and the support pipe 114b of the seat backrest support member 104 are formed unitarily to have the bent portion 118b. Then, the reinforcement plate 122a and the seat belt accommodating portion 124 are mounted to the bent portion 118a, and the reinforcement plate 122b and the seat belt fastening portion 126 are mounted to the bent portion 118b. Then, the support pipes 106a and 106b are coupled to each other by the coupling pipe 108, and the support pipes 114a and 114b are coupled to each other by the coupling pipes 116a and 116b. In this way, the seat frame 14 has a structure in which the seat bottom support member 102 and the seat backrest support member 104 are coupled unitarily to each other via the bent portions 118a and 118b.

Figure 7A:
FIGS. 7A to 7D are views showing steps of manufacturing the seat frame.
Figure 7B:
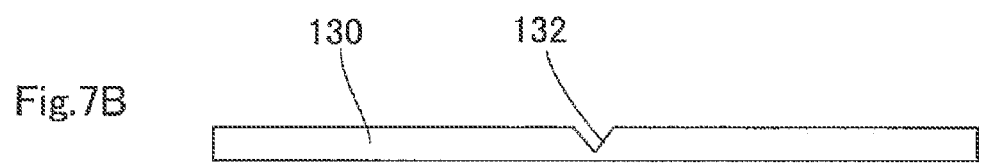
Figure 7C:
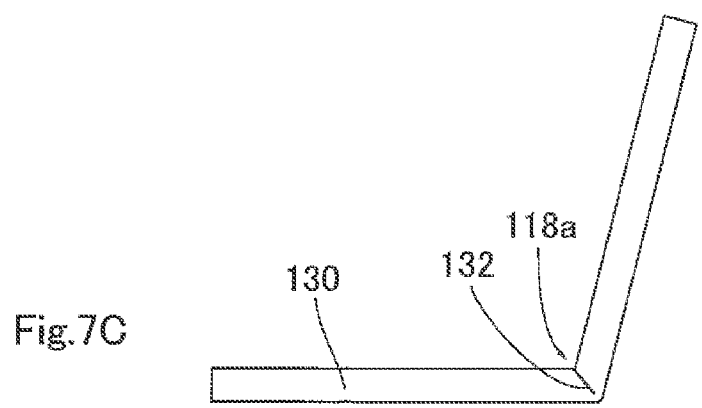
Figure 7D:
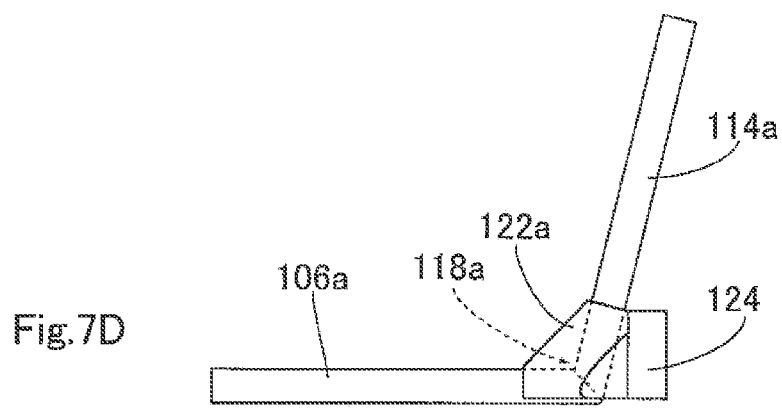

FIGS. 7A to 7D are views of steps of manufacturing the seat frame 14. When the support pipe 106a and the support pipe 114a are coupled unitarily via the bent portion 118a, as shown in FIG. 7A, a square pipe 130 of a straight line shape is prepared. Then, as shown in FIG. 7B, the square pipe 130 is cut in a triangular shape to form a triangular portion 132 on a side wall thereof. Then, as shown in FIG. 7C, the square pipe 130 is bent at a portion having the triangular portion 132 in a direction toward the triangular portion 132, thereby forming the bent portion 118a. Then, the bent portion 118a is welded at the triangular portion 132. Then, as shown in FIG. 7D, the reinforcement plate 122a and the seat belt accommodating portion 124 are mounted to the bent portion 118a. The support pipe 106b and the support pipe 114b are manufactured unitarily via the bent portion 118b, in the steps similar to those shown in FIGS. 7A to 7D.

Figure 8:
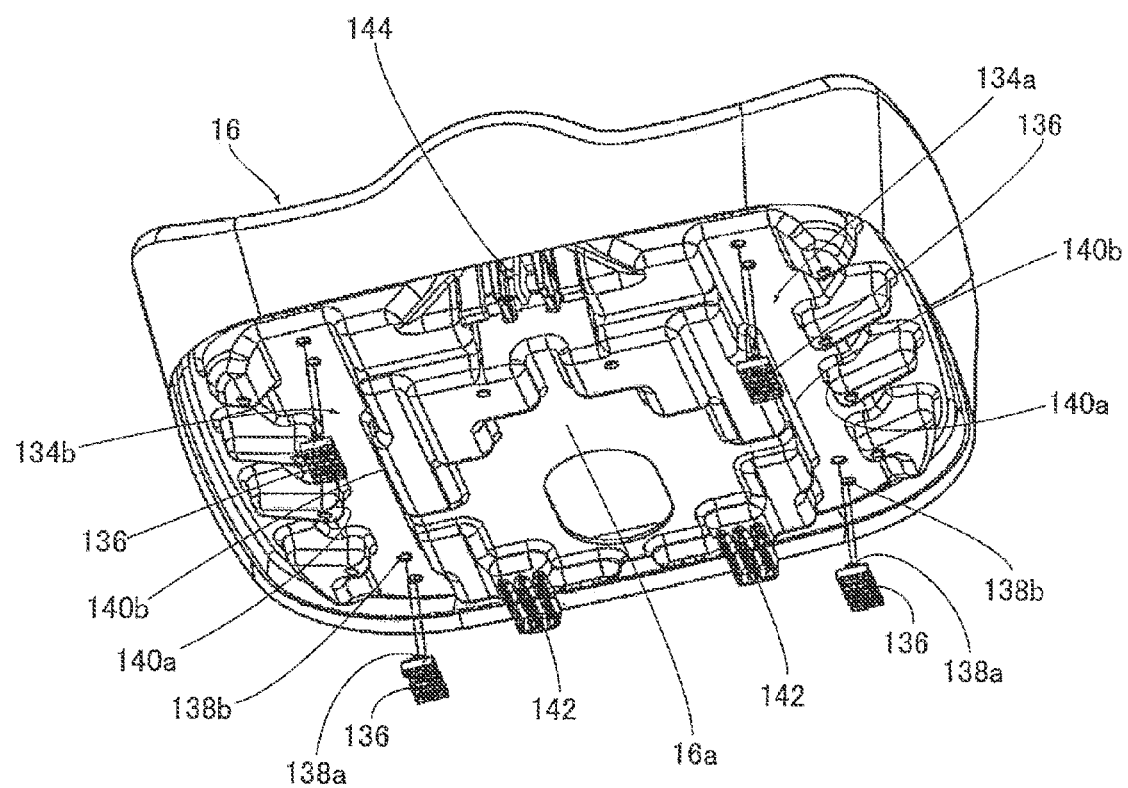
FIG. 8 is a perspective view showing a configuration of a seat bottom as viewed from obliquely downward.

FIG. 8 is a perspective view of the seat bottom 16 as viewed obliquely downward. The seat bottom 16 is formed unitarily using synthetic resin. An upper surface of the seat bottom 16 has a shape in which right and left side portions are higher than a center portion to allow the passenger to be seated thereon comfortably. Grooves 134a and 134b are formed on portions of a lower surface 16a of the seat bottom 16 which are opposite to an upper surface of the seat bottom support member 102 (FIG. 6), to extend in the forward and rearward direction. The grooves 134a and 134b are configured to accommodate the support pipes 106a and 106b (FIG. 6), respectively. At least one rubber-made damper 136, in this embodiment, two rubber-made dampers 136 are provided on the bottom surface of each of the grooves 134a and 134b such that the dampers 136 are spaced apart from each other in the forward and rearward direction. Protrusions 138a are formed on the upper surfaces of the dampers 136, respectively. Holes 138b are formed on the bottom surfaces of the grooves 134a and 134b, respectively. The protrusions 138a of the dampers 136 are fitted into the holes 138b, respectively. On the inner side surfaces of the grooves 134a and 134b, there are formed opposite surfaces 140a and 140b which are opposite to the side surfaces of the support pipes 106a and 106b (FIG. 6) of the seat frame 14 (FIG. 6), in a rightward and leftward direction. Two first engagement mechanisms 142 are provided at a rear end portion of a lower surface 16a of the seat bottom 16 such that they are spaced apart from each other in the rightward and leftward direction. The first engagement mechanisms 142 are engaged with the cross member 80 (FIG. 5) from below. A second engagement mechanism 144 is provided at a front end portion of the lower surface 16a of the seat bottom 16. The second engagement mechanism 144 is engaged with the coupling pipe 108 of the seat frame 14 (FIG. 6) from below. The second engagement mechanism 144 is configured to be operated manually to switch an engaged state and a disengaged state with respect to the coupling pipe 108.

Figure 10:
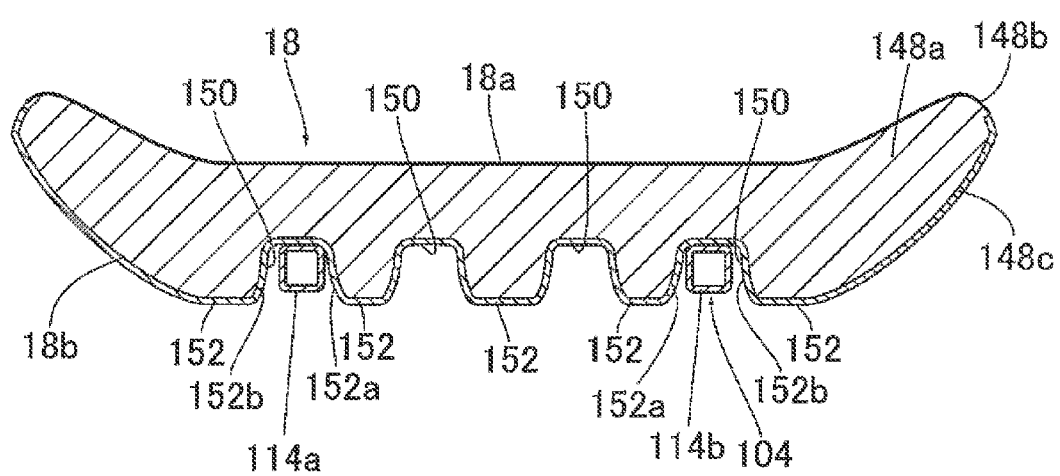
FIG. 10 is a cross-sectional view taken along line X-X in FIG. 9.

FIG. 9 is a perspective view showing a state where the seat backrest 18 is fastened to the seat frame 14. FIG. 10 is a cross-sectional view taken along line X-X in FIG. 9. Referring to FIG. 10, the seat backrest 18 includes a base portion 148a formed of synthetic resin (urethane), a front plate portion 148b which is provided at a front surface of the base portion 148a and formed of synthetic resin, and a back plate portion 148c which is provided at a back surface of the base portion 148a and formed of synthetic resin. The front plate portion 148b forms a front surface 18a of the seat backrest 18. The front surface 18a of the seat backrest 18 is bent such that right and left side portions are protrusive forward relative to a center portion in the rightward and leftward direction to allow the passenger to be seated thereon comfortably.

Referring to FIG. 9, the back surface 18b of the seat backrest 18 has a plurality of recesses 150 and a plurality of convex portions 152. The recesses 150 are continuous vertically to form first accommodating spaces Q1 on the back surface 18b to respectively correspond to the support pipes 114 and 114b, respectively. The recesses 150 are continuous in the rightward and leftward direction to form second accommodating spaces Q2 on the back surface 18b to respectively correspond to the coupling pipes 116a and 116b, respectively. Holes 154 are formed on lower surfaces of the convex portions 152 provided above the first accommodating spaces Q1, to communicate with the first accommodating spaces Q1, respectively. Tip end portions of the support pipes 114a and 114b accommodated into the first accommodating spaces Q1 are inserted into the convex portions 152 through the holes 154, respectively.

Referring to FIG. 9, the seat backrest 18 is fastened to the seat backrest support member 104 using the bolts 120 inserted into the holes 120a of the coupling pipes 116a and 116b, and others. As shown in FIG. 10, in a state where the seat backrest 18 is fastened to the seat backrest support member 104, the seat backrest support member 104 is in contact with the back surface 18b (i.e., bottom surfaces of the recesses 150) of the seat backrest 18, and the seat backrest support member 104 is disposed forward relative to the rear surfaces of the convex portions 152. The rear surfaces of the support pipes 114a and 114b and the rear surfaces of the coupling pipes 116a and 116b are disposed forward relative to rear surfaces of the convex portions 152, respectively. Side surfaces of the convex portions 152 arranged at right and left sides of the first accommodating spaces Q1 are opposite surfaces 152a and 152b which are opposite to the side surfaces of the support pipes 114a and 114b of the seat frame 14, in the rightward and leftward direction.

Referring to FIG. 3, when the seat S1 is mounted to the vehicle body frame 12, the front end portions of the two support pipes 106a and 106b of the seat frame 14 are placed on the support pipes 38 of the main frame 22, and their rear end portions are placed on the cross member 80 of the subframe 24. Thereby, the support pipe 106a of the seat bottom support member 102 is caused to be in surface contact with the plate 42 and the plate 88 of the vehicle body frame 12, the plate 112 (FIG. 6) of the seat bottom support member 102 is caused to be in surface contact with the plate 42 of the vehicle body frame 12, and the reinforcement plate 122b (FIG. 6) of the seat bottom support member 102 is caused to be in surface contact with the plate 88 of the vehicle body frame 12. Then, as shown in FIG. 6, the four bolts 40 are inserted into the holes 110a, 110b, 112a and 128 of the seat frame 14 and into the holes 42a, 88a, 42a and 88a (FIG. 5) of the vehicle body frame 12 (FIG. 3), and the seat frame 14 is fastened to the vehicle body frame 12 (FIG. 3) using these bolts 40. Then, as shown in FIG. 3, the seat bottom 16 is fastened to the cross member 80 and to the seat frame 14 by the first engagement mechanisms 142 and the second engagement mechanism 144. Then, as shown in FIG. 9, the seat backrest 18 is fastened to the seat frame 14 using the bolts 120.

In accordance with the utility vehicle 10 according to Embodiment 1, the seat frame 14 can be manufactured easily by bending and welding the square pipes. The seats S1 to S4 can be easily assembled in such a manner that the seat bottom 16 and the seat backrest 18 are fastened to the seat frame 14. Since at least a portion of the seat bottom support member 102 is fastened to the vehicle body frame 12 in surface contact with the vehicle body frame 12, a sufficient fastening stiffness is obtained and a vibration resistance of the utility vehicle 10, which tends to vibrate significantly, is improved. Since the seat frame 14, the seat bottom 16 and the seat backrest 18 are separate members, only the seat frame 14 can be changed in a case where only a specification of the seat frame 14 is changed.

Since the seat backrest support member 104 of the seat frame 14 is disposed forward relative to the convex portions 152 provided on the back surface 18b of the seat backrest 18, it is possible to avoid, for example, a situation in which the space for the rear seat S3 is reduced because of the presence of the seat backrest support member 104 of the seat frame 14 of the front seat S1. In addition, it is possible to avoid a situation in which a loading space provided behind the rear seat S3 is reduced by the seat backrest support member 104 of the seat frame 14 of the rear seat S3. Since the opposite surfaces 140a and 140b of the seat bottom 16, and the opposite surfaces 152a and 152b of the seat backrest 18 are opposite to the seat frame 14 in the rightward and leftward direction, lateral displacement of the seat bottom 16 and the seat backrest 18 can be prevented. Furthermore, since these opposite surfaces enable the seat bottom 16 and the seat backrest 18 to be positioned with respect to the seat frame 14, the seats S1 to S4 can be assembled more easily.

The rubber-made dampers 136 (FIG. 8) can prevent generation of a noise at a contact portion between the seat bottom 16 and the seat bottom support member 102. Because of a frictional force acting on a contact surface of the dampers 136 and the seat bottom support member 102, displacement of the seat bottom 16 in the forward and rearward direction and in the rightward and leftward direction is suppressed, and as a result, the seat bottom 16 is stably fastened to the seat bottom support member 102. Moreover, since the dampers 136 can be supported by the flat surface of the seat bottom support member 102 constituted by the square pipes, it is possible to prevent a localized force from being applied to the dampers 136. As a result, a life of the dampers 136 can be increased.

Embodiment 2

Figure 11:
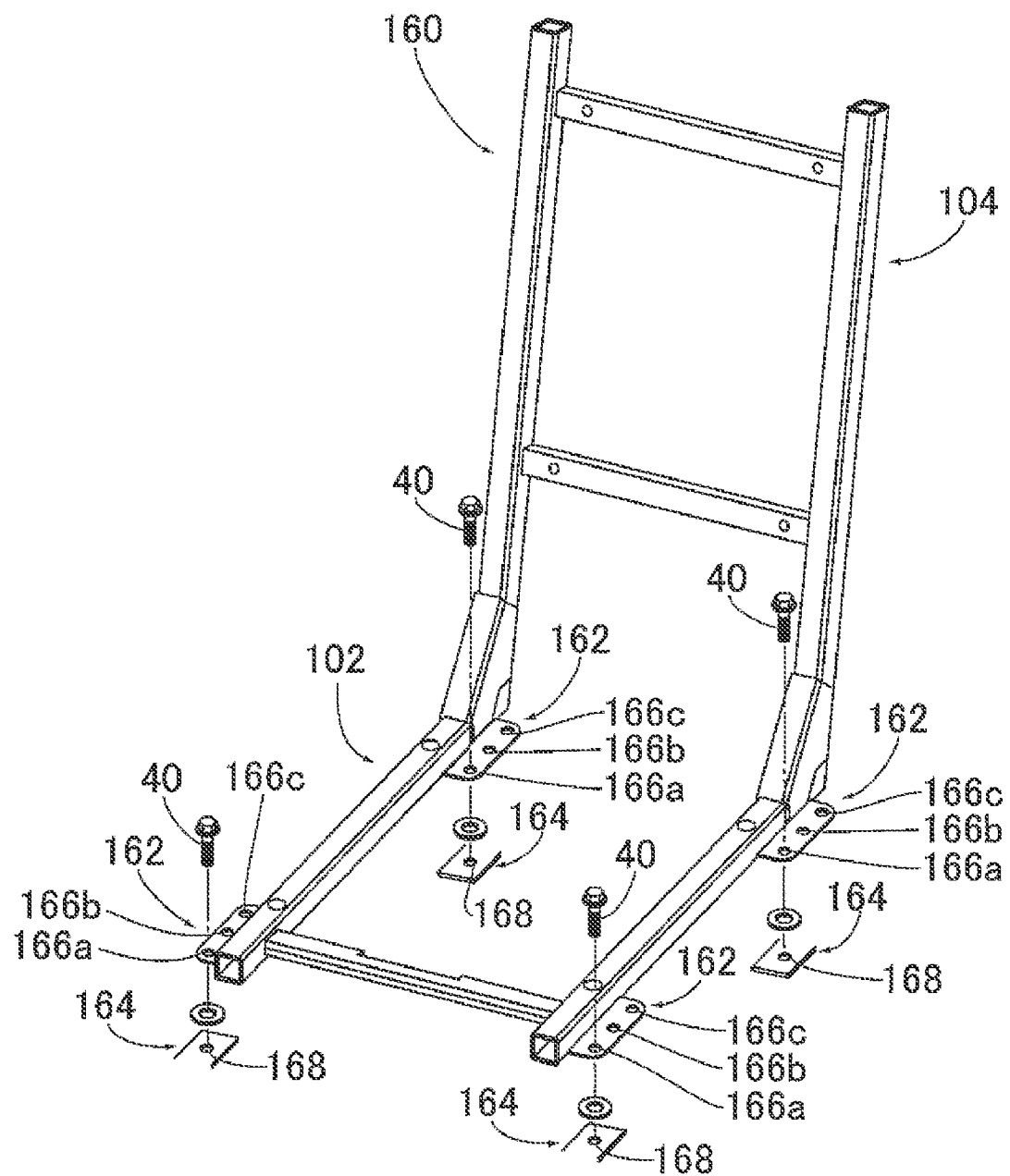
FIG. 11 is a perspective view showing a configuration of a seat frame of a utility vehicle according to Embodiment 2.

FIG. 11 is a perspective view showing a configuration of a seat frame 160 of a utility vehicle according to Embodiment 2. In the utility vehicle of Embodiment 2, the seat frame 160 includes first fastening portions 162 and the vehicle body frame (not shown) includes second fastening portions 164 opposite to the first fastening portions 162, respectively. Each fastening portion 162 has a plurality of (three in this embodiment) first mounting holes 166*a*, 166*b* and 166*c* arranged in the forward and rearward direction, while each second fastening portion 164 has a second mounting hole 168 corresponding to one of the first mounting holes 166*a*, 166*b* and 166*c*. The first fastening portion 162 is fastened to the second fastening portion 164 by the bolt 40 inserted into one of the first mounting holes 166*a*, 166*b* and 166*c* and into the second mounting hole 168. In this configuration, the position of the seat frame 160 with respect to the vehicle body frame can be adjusted at three levels in the forward and rearward direction. The bolt 40 may be replaced by other suitable fastener member and the like.

Alternatively, the second fastening portion 164 may have the first mounting holes 166*a*, 166*b* and 166*c* and the first fastening portion 162 may have the second mounting hole 168 corresponding to one of first mounting holes 166*a*, 166*b* and 166*c*.

Embodiment 3

Figure 12:
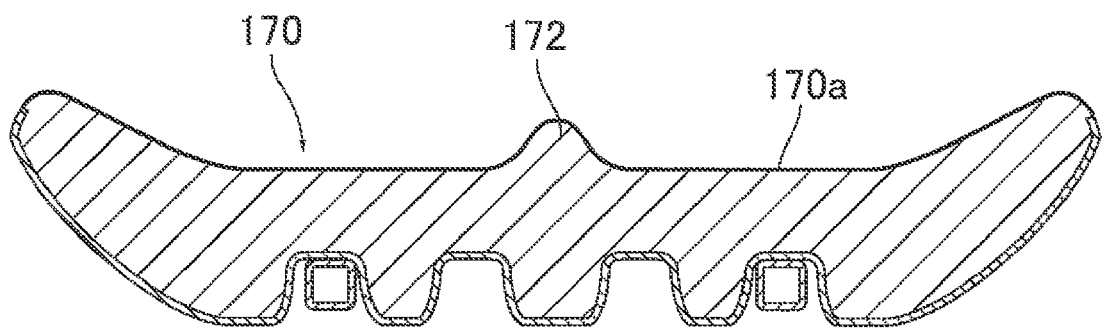
FIG. 12 is a cross-sectional view showing a configuration of a seat backrest of a utility vehicle according to Embodiment 3, substantially taken along line X-X in FIG. 9.

FIG. 12 is a cross-sectional view showing a configuration of a seat backrest 170 of a utility vehicle according to Embodiment 3. In the utility vehicle of Embodiment 3, the seat backrest 170 has on a front surface 170*a* a swelling portion 172 extending protrusively and vertically along a backbone of the passenger. In this configuration, the swelling portion 172 serves to prevent the body of the passenger from being displaced with respect to the seat backrest 170 in the rightward and leftward direction.

Other Embodiment

Although the four seats S1 to S4 arranged at the front and rear sides and at the right and left sides in the above embodiments, the number and arrangement of the seats may be suitably changed as desired. For example, only the seats S1 and S2 may be arranged at the right and left sides, or otherwise only the seats S1 and S3 may be arranged at the front and rear sides in a two-seated utility vehicle.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. A utility vehicle comprising:
a vehicle body frame;
a seat frame including a seat bottom support member and a seat backrest support member, at least the seat bottom support member and the seat backrest support member being formed by square pipes with rectangular cross-sections;
a seat bottom fastened to the seat bottom support member; and
a seat backrest fastened to the seat backrest support member;
wherein the seat bottom support member and the seat backrest support member of the seat frame are integral with each other to have a bent portion;
the seat bottom support member of the seat frame is fastened to the vehicle body frame;
the seat backrest has a convex portion and a recess on a back surface thereof; and
the seat backrest support member is fastened to the seat backrest in contact with a back surface of the seat backrest and is disposed forward relative to a rear surface of the convex portion.

2. The utility vehicle according to claim 1,
wherein the seat bottom support member of the seat frame is fastened to the vehicle body frame in such a manner that the seat bottom support member is in surface contact with the vehicle body frame.

3. A utility vehicle comprising:
a vehicle body frame;
a seat frame including a seat bottom support member and a seat backrest support member, at least the seat bottom support member and the seat backrest support member being formed by square pipes with rectangular cross-sections;
a seat bottom fastened to the seat bottom support member; and
a seat backrest fastened to the seat backrest support member;
wherein the seat bottom support member and the seat backrest support member of the seat frame are integral with each other to have a bent portion;
the seat bottom support member of the seat frame is fastened to the vehicle body frame; and
each of the seat bottom and the seat backrest has an opposite surface opposite to the seat frame in a rightward and leftward direction.

4. A utility vehicle comprising:
a vehicle body frame;
a seat frame including a seat bottom support member and a seat backrest support member, at least the seat bottom support member and the seat backrest support member being formed by square pipes with rectangular cross-sections;
a seat bottom fastened to the seat bottom support member; and
a seat backrest fastened to the seat backrest support member;
wherein the seat bottom support member and the seat backrest support member of the seat frame are integral with each other to have a bent portion;
the seat bottom support member of the seat frame is fastened to the vehicle body frame; and
the seat bottom is provided with a rubber-made damper on a portion of a lower surface of the seat bottom which is opposite to an upper surface of the seat bottom support member.

5. The utility vehicle according to claim 1,
wherein the seat frame having the bent portion has a configuration in which a square pipe of a straight-line shape is bent at a portion of the square pipe which is provided with a portion formed by cutting, in a direction toward the portion formed by cutting, and the portion formed by cutting is welded.

6. The utility vehicle according to claim 1,
wherein at the bent portion or in a vicinity of the bent portion of the seat frame, a seat belt accommodating portion is fastened to the seat bottom support member and the seat backrest support member.

7. A utility vehicle comprising:
a vehicle body frame;

a seat frame including a seat bottom support member and a seat backrest support member, at least the seat bottom support member and the seat backrest support member being formed by square pipes with rectangular cross-sections;

a seat bottom fastened to the seat bottom support member; and a seat backrest fastened to the seat backrest support member;

wherein the seat bottom support member and the seat backrest support member of the seat frame are integral with each other to have a bent portion;

the seat bottom support member of the seat frame is fastened to the vehicle body frame;

the seat frame includes a first fastening portion;

the vehicle body frame includes a second fastening portion opposite to the first fastening portion;

one of the first fastening portion and the second fastening portion has a plurality of first mounting holes arranged in a forward and rearward direction;

the other of the first fastening portion and the second fastening portion has a second mounting hole corresponding to one of the plurality of first mounting holes; and the first fastening portion is fastened to the second fastening portion by a fastener member inserted into one of the plurality of first mounting holes and into the second mounting hole.

8. A utility vehicle comprising:

a vehicle body frame;

a seat frame including a seat bottom support member and a seat backrest support member, at least the seat bottom support member and the seat backrest support member being formed by square pipes with rectangular cross-sections;

a seat bottom fastened to the seat bottom support member; and a seat backrest fastened to the seat backrest support member;

wherein the seat bottom support member and the seat backrest support member of the seat frame are integral with each other to have a bent portion;

the seat bottom support member of the seat frame is fastened to the vehicle body frame; and the seat backrest has, on a front surface thereof, a swelling portion extending along a backbone of a passenger.

9. The utility vehicle according to claim 1, comprising:

a plurality of seats arranged at least either front and rear sides or at right and left sides; the seats being provided separately; and each of the plurality of seats includes the seat frame, the seat bottom and the seat backrest.

\* \* \* \* \*